United States Patent
Zhang et al.

(10) Patent No.: US 11,099,945 B2
(45) Date of Patent: Aug. 24, 2021

(54) METHOD, DEVICE, AND COMPUTER PROGRAM PRODUCT FOR BACKING UP DATA

(71) Applicant: EMC IP Holding Company LLC, Hopkinton, MA (US)

(72) Inventors: Ming Zhang, Shanghai (CN); Weiyang Liu, Shanghai (CN); Yun Zhang, Shanghai (CN); Jing Yu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/794,514

(22) Filed: Feb. 19, 2020

(65) Prior Publication Data
US 2021/0117287 A1   Apr. 22, 2021

(30) Foreign Application Priority Data
Oct. 17, 2019   (CN) .......................... 201910989407.4

(51) Int. Cl.
*G06F 11/14*   (2006.01)
*H04L 12/24*   (2006.01)

(52) U.S. Cl.
CPC ...... *G06F 11/1464* (2013.01); *G06F 11/1451* (2013.01); *G06F 11/1461* (2013.01); *G06F 11/1469* (2013.01); *H04L 41/5003* (2013.01)

(58) Field of Classification Search
CPC ............. G06F 11/1464; G06F 11/1461; G06F 11/1469; G06F 11/1451; G06F 9/546; H04L 41/5003
USPC ....................................... 714/4.11
See application file for complete search history.

(56) References Cited

U.S. PATENT DOCUMENTS

2016/0077925 A1*   3/2016   Tekade .................. G06F 3/065
                                                  707/654

* cited by examiner

*Primary Examiner* — Yair Leibovich
(74) *Attorney, Agent, or Firm* — Chamberlain, Hrdlicka, White, Williams & Aughtry (57) ABSTRACT

Embodiments of the present disclosure relate to a method, a device, and a computer program product for backing up data. A method for backing up data includes: receiving a request for a backup policy for a data from a user, the request indicating a desired backup period for backing up the data; obtaining backup information associated with the data; and generating, based on the desired backup period and the backup information, a backup policy for the data and satisfying a service level agreement.

18 Claims, 5 Drawing Sheets

METHOD, DEVICE, AND COMPUTER PROGRAM PRODUCT FOR BACKING UP DATA

CROSS-REFERENCE TO RELATED APPLICATIONS

This application claims benefit to Chinese Patent Application 201910989407.4 filed on Oct. 17, 2019. Chinese Patent Application 201910989407.4 is hereby incorporated by reference in its entirety.

FIELD OF THE INVENTION

Embodiments of the present disclosure generally relate to the field of data backup, and specifically relate to a method, an electronic device, and a computer program product for backing up data.

BACKGROUND

With a large increase of user data and continuous development of backup technologies, more and more users use data protection products such as data backup systems and data storage software to help manage and protect their data assets.

Generally, a user needs to configure a data protection policy on the data protection product according to his/her own requirements and experience. Moreover, the data protection policy should also comply with applicable data protection regulations in relevant geographic areas. Then, the data protection product implements protection measures for the user's assets according to the data protection policy, for example, periodically backing up the user's assets. Therefore, whether the data protection effect finally meets the user's demands depends largely on the data protection policy used.

SUMMARY

Embodiments of the present disclosure provide a method, an electronic device, and a computer program product for backing up data.

According to a first aspect of the present disclosure, a method for backing up data is provided. The method includes: receiving a request for a backup policy for data from a user, the request indicating a desired backup period for backing up the data; obtaining backup information associated with the data; and generating, based on the desired backup period and the backup information, a backup policy for the data and satisfying a service level agreement.

According to a second aspect of the present disclosure, an electronic device is provided. The electronic device includes at least one processing unit; and at least one memory. The at least one memory is coupled to the at least one processing unit and stores instructions to be executed by the at least one processing unit, and when executed by the at least one processing unit, the instructions cause the electronic device to execute actions including: receiving a request for a backup policy for data from a user, the request indicating a desired backup period for backing up the data; obtaining backup information associated with the data; and generating, based on the desired backup period and the backup information, a backup policy for the data and satisfying a service level agreement.

According to a third aspect of the present disclosure, a computer program product is provided. The computer program product is tangibly stored in a non-transitory computer storage medium and includes machine executable instructions, and when executed by a device, the machine executable instructions cause the device to execute actions including: receiving a request for a backup policy for data from a user, the request indicating a desired backup period for backing up the data; obtaining backup information associated with the data; and generating, based on the desired backup period and the backup information, a backup policy for the data and satisfying a service level agreement.

The part of Summary is provided to introduce selection of concepts in a simplified form, which are further described in the Detailed Description below. The part of Summary is not intended to identify key features or essential features of the present disclosure and is also not intended to limit the scope of the present disclosure.

BRIEF DESCRIPTION OF THE DRAWINGS

Exemplary embodiments of the present disclosure are described in more detail with reference to the accompanying drawings, so the above and other objects, features, and advantages of the present disclosure will become more apparent, and in the exemplary embodiments of the present disclosure, identical reference numerals usually indicate identical components.

Identical or corresponding numerals in the drawings indicate identical or corresponding parts.

DETAILED DESCRIPTION

Various embodiments of the present disclosure are described now with reference to various exemplary embodiments shown in the drawings. It is to be understood that the description of the embodiments is merely intended to enable those skilled in the art to better understand and further implement the present disclosure and is not intended to limit the scope of the present disclosure in any way. It should be noted that similar or identical reference numerals may be used in the drawings where feasible, and similar or identical reference numerals may indicate similar or identical elements. It will be understood by those skilled in the art from the following description that alternative embodiments of structures and/or methods described herein may be employed without departing from the principles and conceptions of the present disclosure as described.

In the context of the present disclosure, the term "include" and its various variants may be understood as open terms, which mean "including but not limited to"; the term "based on" may be understood as "based at least in part on"; the term "one embodiment" may be understood as "at least one embodiment"; and the term "another embodiment" may be understood as "at least one another embodiment." Other terms that may occur but are not mentioned herein, unless expressly stated, should not be interpreted or defined in contrary to the conceptions on which the embodiments of the present disclosure are based.

Currently, data protection products can help users to protect their data assets by using data protection policies, e.g., backup policies. As described above, whether the data protection effect can finally meet a user's demands depends largely on the data protection policy used. In practice, these data protection products are highly dependent on users or backup administrators to configure data protection policies, which is often difficult for users who lack sufficient relevant knowledge and experience. For example, users may be unable to determine which data protection policy is most appropriate for a particular data asset, e.g., unable to determine which one of hourly backup, weekly backup, or monthly backup should be used for Structured Query Language (SQL) applications or files.

Additionally, when configuring a data protection policy, users may complete the entire configuration process through a wizard of a data protection product. The wizard usually includes a plurality of steps for guiding users to determine a data protection policy. Sometimes, users cannot determine what information the wizard wants them to input, which will lead to a cumbersome configuration process, being adverse to generation of an appropriate data protection policy.

According to an embodiment of the present disclosure, a scheme for automatically creating a data protection policy is provided. The scheme uses information such as input their confirmed information, such as the number of data assets to be backed up, importance of the data assets to be backed up, and amount of data loss tolerable by the users, and then generates a recommended backup policy based on the information input by the users and applicable data protection regulations in relevant geographic areas, such that the interaction between users and data protection products is simpler. In various embodiments of the invention, users only input a request for a backup policy for data with no need for relevant data protection experience and knowledge, which greatly simplifies the configuration process of a data backup policy and improves backup efficiency.

Figure 1:
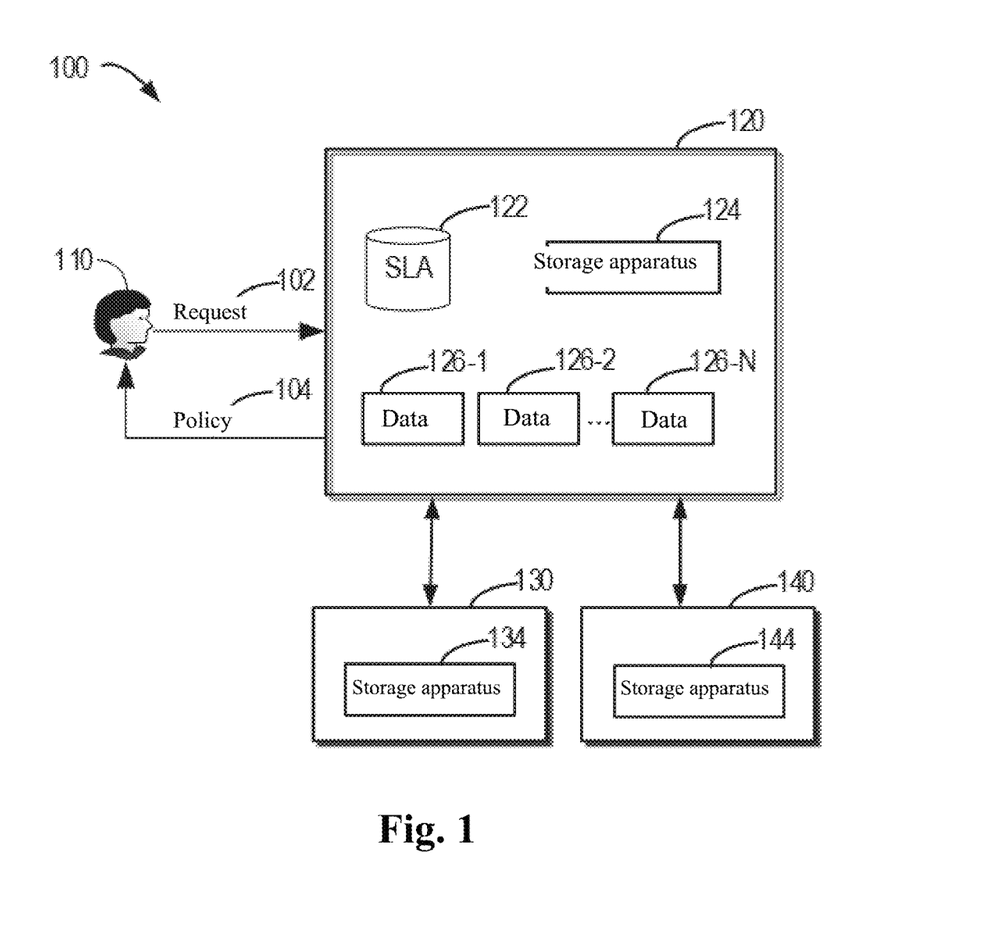
FIG. 1 shows a schematic diagram of an exemplary environment in which a device and/or method according to an embodiment of the present disclosure may be implemented.

FIG. 1 shows a schematic diagram of exemplary environment 100 in which a device and/or method according to an embodiment of the present disclosure may be implemented. As shown in FIG. 1, exemplary environment 100 includes user 110, computing device 120 and network devices 130 and 140. User 110 may interact with computing device 120. For example, user 110 may send request 102 to computing device 120 and receive policy 104 from computing device 120. Computing device 120 may communicate with network devices 130 and 140 via any wired and/or wireless connection.

Computing device 120 may be any device that can process computing tasks, including but not limited to physical hosts, servers, and the like. Computing device 120 may include service level agreement (SLA) 122, storage apparatus 124, and one or more data assets 126-1, 126-2 . . . 126-N, such as text files, multi-media files, images, and any number of virtual machines. Hereinafter, the data assets 126-1, 126-2 . . . 126-N may be collectively referred to as "data 126" or "data asset 126."

Computing device 120 may include one or more general-purpose computing resources or dedicated computing resources for generating data and implementing data backup. Examples of the general-purpose computing resources may include, but are not limited to, a central processing unit (CPU), and examples of the dedicated computing resources may include, but are not limited to, a graphics processing unit (GPU), a field programmable gate array (FPGA), and an artificial intelligence processor (AI processor), and the like.

Storage apparatus 124 may be any type of storage apparatuses for storing data (e.g., data 126), for example, a local memory. In some embodiments, storage apparatus 124 may be a solid-state disk (SSD). The examples above are merely intended to describe the present disclosure and are not intended to limit the present disclosure specifically.

Network devices 130 and 140 may be remote storage devices that are physically far away from computing device 120 and may each include any type of storage apparatuses 134 and 144, including but not limited to data backup centers, databases, backup servers, clouds, and the like. In some embodiments, network devices 130 and 140 may access computing device 120 and read data 126 via a network, respectively.

The schematic diagram of exemplary environment 100 in which a device and/or method according to an embodiment of the present disclosure may be implemented is described above in conjunction with FIG. 1. It should be understood that exemplary environment 100 is described merely for exemplary purposes, and is not intended to imply any limitation to the scope of the present disclosure. For example, exemplary environment 100 may further include any number of and any type of network devices, and any suitable number of intermediate nodes located between computing device 120 and network devices 130 and 140.

Figure 2:
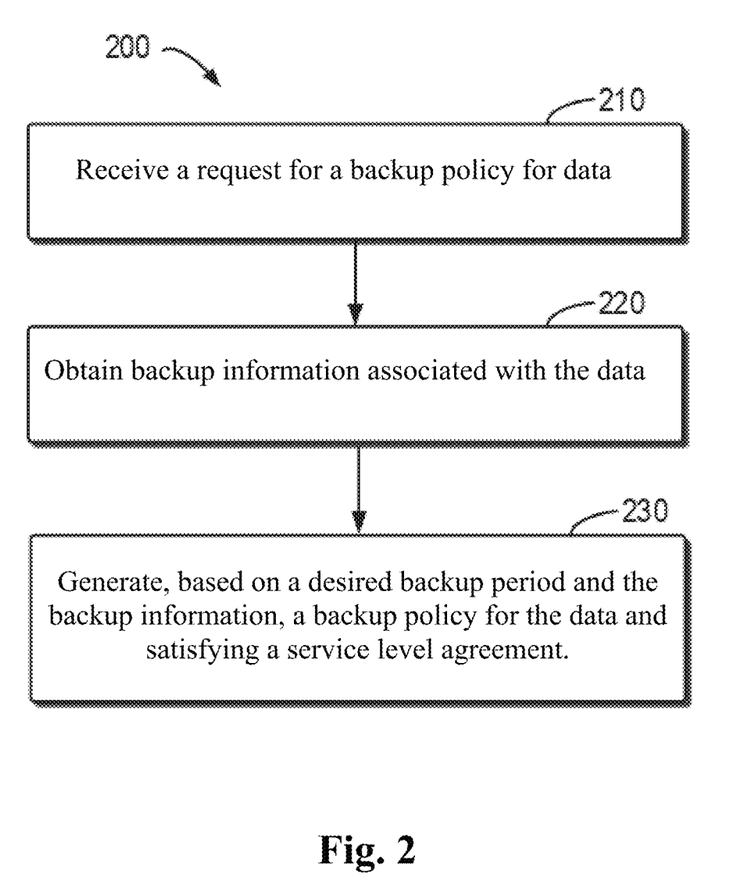
FIG. 2 shows a flow chart of a method for backing up data according to an embodiment of the present disclosure.

FIG. 2 shows a flow chart of method 200 for backing up data according to an embodiment of the present disclosure. Method 200 may be executed by computing device 120 shown in FIG. 1 and may also be executed by other suitable devices. For convenience of description, method 200 is described below in conjunction with a network shown in FIG. 1. It should be understood that method 200 may also include additional actions not illustrated and/or may omit the illustrated actions, and the scope of the present disclosure is not limited in this respect.

At 210, computing device 120 receives request 102 for a backup policy for data 126 from user 110. In some embodiments, request 102 from user 110 indicates a desired backup period for backing up data 126. In some embodiments, the desired backup period may be characterized by a recovery point objective (RPO). RPO represents, after a fault occurs, recovering data to the data at a specific time point before occurrence of the fault, and is usually used to describe the largest amount of data loss tolerable by the user or device. For example, user 110 may input a request to computing device 120 to indicate that his/her desired RPO is 6 hours, i.e., the desired backup period is 6 hours.

At 220, computing device 120 obtains backup information associated with data 126. For example, the backup information may include a backup type of data 126 (such as full backup and differential backup), a size of the data, a type of the data (e.g., a virtual machine), a rate of change of the data, and the like. The backup data may also include a network bandwidth for backing up the data, a location and an available bandwidth of a storage device (e.g., network devices 130 and 140) for backing up the data, and the like.

In some embodiments, computing device 120 may also receive adjustment information for the service level agreement (SLA) from user 110. The SLA is an agreement about a series of service level objectives (SLO) between a network service provider and a user. For example, the SLA may define the service type, service quality, minimum bandwidth allocated to the user, supported minimum network utilization performance, traffic priority, etc., provided by the network service provider to the user. As described above, the backup policy should comply with the SLA and relevant data protection regulations, for example, General Data Protection Regulation (GDPR) introduced by the European Union in 2016. GDPR aims to curb abuse of user information and protect private data of users. As specified in the GDPR, users in Europe shall abide by GDPR, and users outside Europe may also choose to abide by GDPR. As another example, a "321 Backup Principle" stipulates that 3 copies of backup data should be stored, one of which should be stored in a production environment. The backup data should be stored in two different storage media, and one copy of backup data should be stored in a remote environment.

In some embodiments, computing device 120 may set the SLA based on the adjustment information. For example, in the case where user 110 chooses to back up data in accordance with the "321 Backup Principle," computing device 120 may set SLA 122 based on the "321 Backup Principle."

At 230, computing device 120 generates, based on the desired backup period and the backup information, backup policy 104 for data 126 and satisfying the service level agreement. In some embodiments, computing device 120 may provide backup policy 104 to user 110, for example, by an output device. This will be described in detail in FIG. 3 below.

The data backup method according to the embodiments of the present disclosure can automatically generate a backup policy that meets the expectation of a user according to a current network environment and a service level agreement, or provide an appropriate backup suggestion to the user, so that the configuration process of a data protection policy is simplified and a data backup scheme is customized to the user's requirements.

Figure 3:
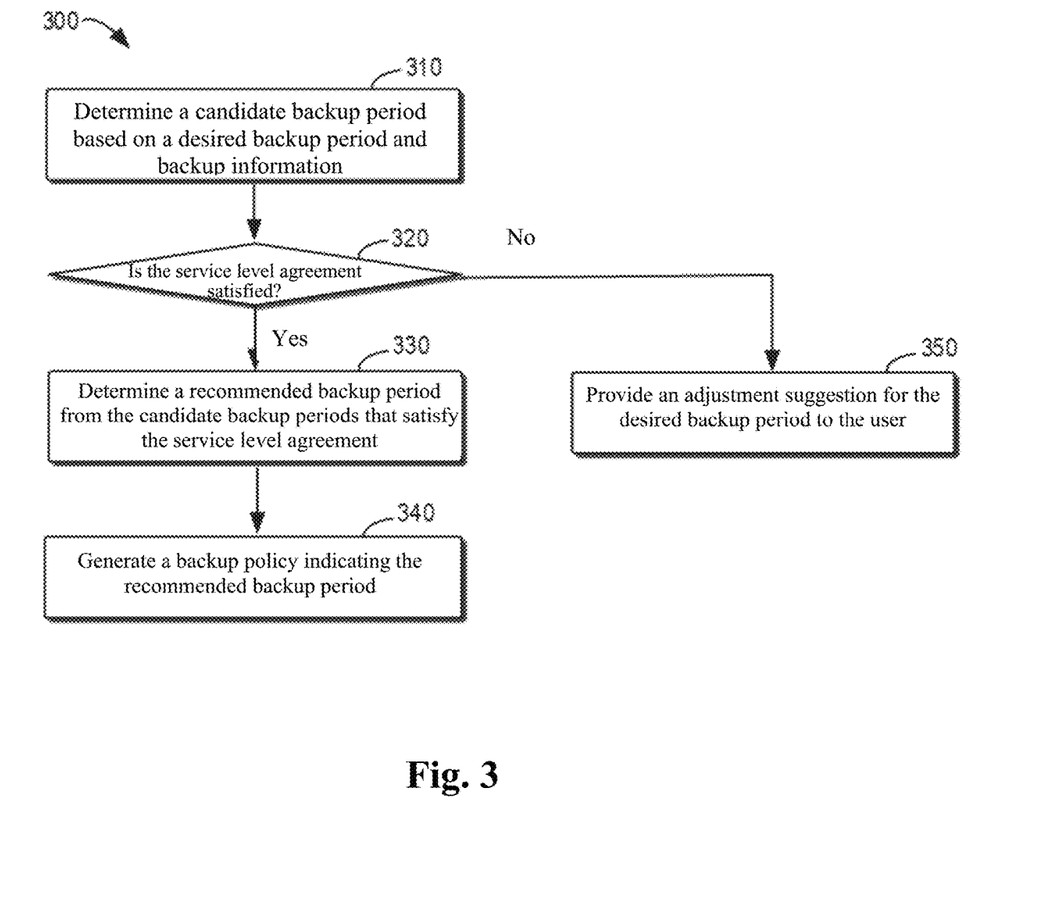
FIG. 3 shows a flow chart of a method for backing up data according to an embodiment of the present disclosure.

FIG. 3 shows a flow chart of method 300 for backing up data according to an embodiment of the present disclosure. Method 300 is a detailed description of step 230 in FIG. 2, may be executed by computing device 120 shown in FIG. 1, and may also be executed by other suitable devices. For convenience of description, method 300 is described below in conjunction with the network shown in FIG. 1. It should be understood that method 300 may also include additional actions not illustrated and/or may omit the illustrated actions, and the scope of the present disclosure is not limited in this respect.

At 310, computing device 120 determines one or more candidate backup periods based on the desired backup period and backup information input by user 110. In some embodiments, computing device 120 may further obtain an efficiency factor $\alpha$ and utilize the efficiency factor $\alpha$ to adjust the determined candidate backup period. The efficiency factor $\alpha$ may be set based on a storage medium type of a source device of the data, a network bandwidth for backing up the data, a deduplication rate of the data, a location of a storage device for backing up the data, an available bandwidth of the storage device, and the like. As an example, computing device 120 may obtain the following desired backup period and backup information:

a desired backup period of 6 hours;
the number and sizes of virtual machines to be backed up, i.e., the data 126;
an average rate of change of the data;
a deduplication rate of the data;
a speed at which the source data is read, i.e., an available network bandwidth at computing device 120;
a speed at which the data is received, i.e., a network bandwidth at network devices 130 and 140 for storing and backing up the data;
the number of data streams, and the like.

Computing device 120 can perform different types of backup of data 126. Full backup can realize backup of all data 126 at a certain time point, such that in practical applications, the data can be recovered to a predetermined RPO at one time, which greatly accelerates the recovery of the system or data. Differential backup can only back up data added or modified in data 126 in a time period since the last full backup, so that differential backup requires less storage space and shorter backup time than full backup. Incremental backup can only back up data that is added or modified compared to the previous one after the last full or incremental backup. Compared with differential backup, the time reference points for backup are different.

For example, when taking weekly data backups, it is assumed that a full backup is performed on Monday and differential backup is performed on Tuesday to Friday. If the data is destroyed on Friday, only the full backup on Monday and the differential backup on Thursday need to be recovered. In such policy, it takes more time to back up data, but less time to recover data.

For another example, still taking weekly data backups it is assumed that full backup is performed on Monday and incremental backup is performed on Tuesday to Friday. If the data is destroyed on Friday, the full backup on Monday and all the incremental backup on Tuesday to Friday need to be recovered. In such policy, it takes less time to back up data, but more time to recover data.

In some embodiments, computing device 120 may determine candidate backup periods for different backup types according to equations (1) and (2) below $$TF = \alpha \times \frac{\Sigma_1^n AS}{\text{Min(Reading bandwidth, Receiving bandwidth)}} \quad (1)$$

In equation (1), TF represents a backup period required for one-time full backup of data 126, $\alpha$ represents an efficiency factor, $\Sigma_1^n AS$ represents a size of data 126, and Min (Reading bandwidth, Receiving bandwidth) represents the minimum value of a reading speed and a receiving speed.

As an alternative, in some embodiments, computing device 120 may also determine candidate backup periods for different backup types according to equation (2) below:

$$TD = \alpha \times \frac{\Sigma_1^n AS \times \text{Rate of change of data}}{\text{Min(Reading bandwidth, Receiving bandwidth)}} \quad (2)$$

In equation (2), TD represents a backup period required for one-time differential backup of data 126, $\alpha$ represents an efficiency factor, $\Sigma_1^n AS$ represents a size of data 126, and Min (Reading bandwidth, Receiving bandwidth) represents the minimum value of a reading speed and a receiving speed. A rate of change of data represents a rate of change of data 126 within a predetermined period obtained according to use experience.

The equations (1) and (2) above are non-limiting examples. Further, the aforementioned equations may be modified and/or other equations may be used in other embodiments of the inventions to address other factors that impact backup generation. In addition, it should be understood that computing device 120 may also perform other types of backup for data 126, and examples of the backup types are not intended to imply any limitation to the scope of the present disclosure.

For example, according to the equations (1) and (2) above, computing device 120 may determine that 6 hours, 5 hours, 4 hours, 3 hours, 2 hours, and 1 hour all meet the user's demand for performing one backup every 6 hours. Certainly, in the case where the candidate backup period does not exceed the desired backup period, computing device 120 may also determine the candidate backup period according to other standards of division.

At 320, computing device 120 determines whether one or more candidate backup periods satisfy an SLA. For example, computing device 120 determines whether the candidate backup periods 6 hours, 5 hours, 4 hours, 3 hours, 2 hours, and 1 hour respectively satisfy the SLA applicable to the "321 Backup Principle" selected by the user. If one or more of the candidate backup periods satisfy the SLA, the method proceeds to 330, otherwise proceeds to 350.

In some embodiments, computing device 120 may determine that a part of or all the candidate backup periods satisfy the SLA. Then, at 330, computing device 120 may determine a recommended backup period from the candidate backup periods that satisfy the SLA.

As an example, computing device 120 determines that the candidate backup periods 6 hours, 5 hours, 4 hours, 3 hours, 2 hours, and 1 hour all satisfy the SLA applicable to the "321 Backup Principle" selected by the user. However, not all candidate backup periods are needed by user 110. For example, in terms of optimal backup quality, a backup period of 1 hour may be recommended to user 110, while in terms of saving backup space, a backup period of 6 hours may be recommended to user 110. Other candidate backup periods of 5 hours, 4 hours, 3 hours, and 2 hours are not, in this example, obviously different from each other in terms of backup quality or backup space.

At 340, computing device 120 generates backup policy 104 indicating the recommended backup period. In some embodiments, computing device 120 may generate a backup policy to indicate a recommended backup period including an optimal backup quality policy and/or a most backup space-saving policy, such as 6 hours and 1 hour. In some embodiments, the backup policy may also indicate a start time, an end time, and a duration for backing up data 126, a location of a storage device for backing up, and the like.

Additionally, in some embodiments, in the case where computing device 120 determines at 320 that a candidate backup period that satisfies the SLA cannot be found, thereby failing to obtain a backup policy to be recommended to the user, computing device 120 then provides an adjustment suggestion for the desired backup period to user 110 at 350, for example, suggesting user 110 to adjust the desired backup period to 7 hours.

Figure 4:
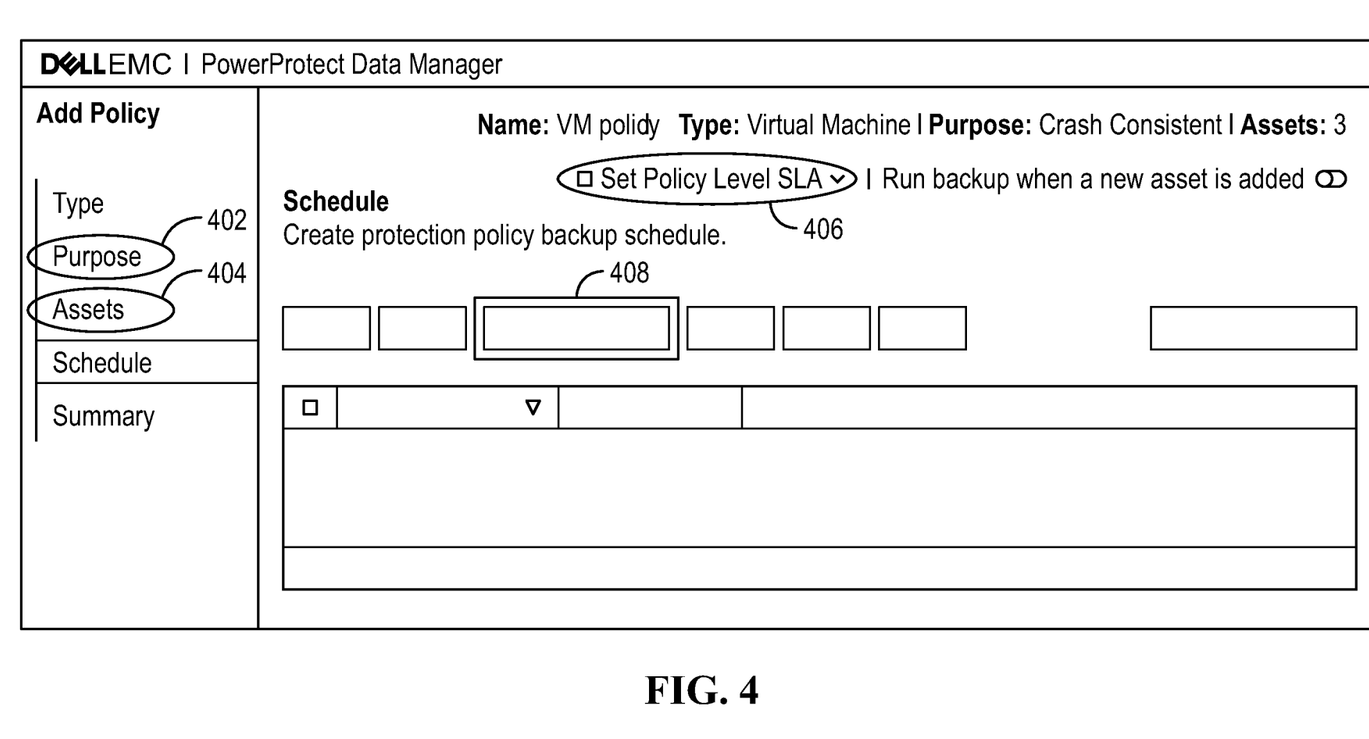
FIG. 4 shows a schematic diagram of a user interface of a data backup system according to an embodiment of the present disclosure.

FIG. 4 shows a schematic diagram of a user interface of a data backup system according to an embodiment of the present disclosure. The user interface may be, for example, a user interface of a data backup wizard, and may be provided to user 110 through the output device of computing device 120 shown in FIG. 1. Of course, it may also be provided by other suitable devices. It should be understood that the user interface illustrated in FIG. 4 is merely exemplary and the scope of the present disclosure is not limited thereto.

As shown in FIG. 4, user 110 may set the desired backup period at 402, select data 126 to be backed up at 404, and set or modify the SLA at 406. Then, computing device 120 generates, based on the desired backup period and the backup information, the backup policy for data 126 and satisfying the SLA and provides it to user 110 at 408.

Figure 5:
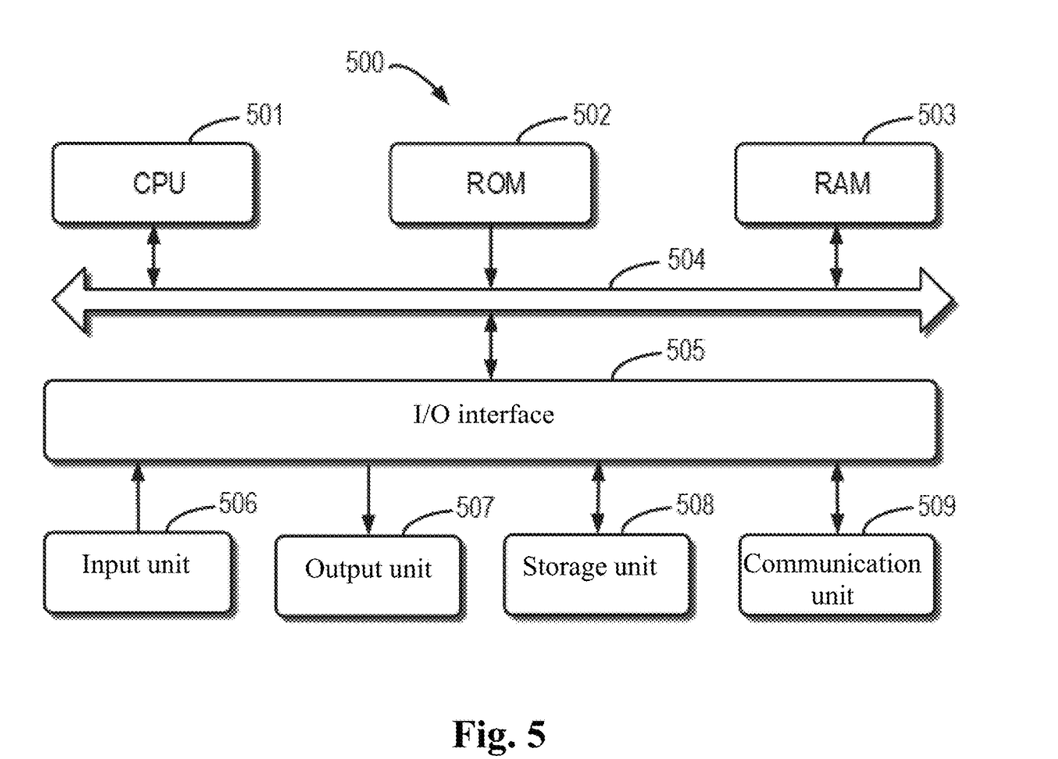
FIG. 5 shows a schematic block diagram of a device that may be configured to implement embodiments of the present disclosure.

FIG. 5 shows a schematic block diagram of exemplary device 500 that may be configured to implement embodiments of the present disclosure. For example, device 500 may serve as computing device 120 shown in FIG. 1. As shown in the drawing, device 500 includes central processing unit (CPU) 501 which may execute various appropriate actions and processing according to computer program instructions stored in read-only memory (ROM) 502 or computer program instructions loaded into random access memory (RAM) 503 from storage unit 508. Various programs and data needed for operations of device 500 may also be stored in RAM 503. CPU 501, ROM 502 and RAM 503 are connected with each other through bus 504. Input/output (I/O) interface 505 is also connected to bus 504.

A plurality of components in device 500 are connected to I/O interface 505, including input unit 506, such as a keyboard and a mouse; output unit 507, such as various types of displays and speakers; storage unit 508, such as a magnetic disk and an optical disk; and communication unit 509, such as a network card, a modem and a wireless communication transceiver. Communication unit 509 allows device 500 to exchange information/data with other devices through a computer network (e.g., the Internet) and/or various telecommunication networks.

Each procedure and processing described above, such as methods 200 and 300 may be executed by processing unit 501. For example, in some embodiments, methods 200 and 300 may be implemented as a computer software program that is tangibly contained in a machine readable medium, for example, storage unit 508. In some embodiments, a part of or all the computer program may be loaded and/or installed into device 500 via ROM 502 and/or communication unit 509. When being loaded into RAM 503 and executed by CPU 501, the computer program may execute one or more actions in method 500 described above.

The present disclosure may be a method, an apparatus, a system, and/or a computer program product. The computer program product may include a computer-readable storage medium with computer-readable program instructions for executing various aspects of the present disclosure loaded therein.

The computer-readable storage medium may be a tangible device that may retain and store instructions used by an instruction executing device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device (such as a punched card or an in-groove raised structure with instructions stored therein), and any suitable combination thereof. The computer-readable storage medium used herein is not interpreted as transient signals themselves, such as radio waves or other freely propagated electromagnetic waves, electromagnetic waves propagated through waveguides or other transmission media (e.g., light pulses through fiber-optic cables), or electrical signals transmitted through wires.

The computer-readable program instruction described herein may be downloaded to various computing/processing devices from the computer-readable storage medium, or downloaded to an external computer or external storage device through a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for executing operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk, and C++, and conventional procedural programming languages, such as the "C" language or similar programming languages. The computer-readable program instruction may be completely executed on a user computer, partially executed on the user computer, executed as a separate software package, partially executed on the user computer and partially executed on a remote computer, or completely executed on the remote computer or a server. In the case where a remote computer is involved, the remote computer may be connected to a user computer through any type of network including a local area network (LAN) or a wide area network (WAN), or may be connected to an external computer (for example, connected through the Internet by using an Internet service provider). In some implementations, an electronic circuit, such as a programmable logic circuit, a field programmable gate array (FPGA), or a programmable logic array (PLA), is customized by utilizing state information of the computer-readable program instructions, and the electronic circuit may execute the computer-readable program instructions, so as to implement various aspects of the present disclosure.

The various aspects of the present disclosure are described with reference to the flow charts and/or block diagrams of the method, apparatus (system), and computer program product implemented according to the present disclosure. It should be understood that each block of the flow charts and/or block diagrams, and combinations of blocks in the flow charts and/or block diagrams may all be implemented by the computer-readable program instructions.

The computer-readable program instructions may be provided to a processing unit of a general-purpose computer, a special-purpose computer, or another programmable data processing apparatus to generate a machine, such that these instructions generate, when executed by the processing unit of the computer or another programmable data processing apparatus, an apparatus for implementing functions/actions specified in one or more blocks of the flow charts and/or block diagrams. These computer-readable program instructions may also be stored in a computer-readable storage medium to enable a computer, a programmable data processing apparatus, and/or other devices to operate in a particular mode, such that the computer-readable medium storing the instructions includes a manufactured product that includes instructions for implementing various aspects of the functions/actions specified in one or more blocks of the flow charts and/or block diagrams.

These computer-readable program instructions may also be loaded to a computer, other programmable data processing apparatuses, or other devices, so as to execute a series of operating steps on the computer, other programmable data processing apparatuses, or other devices to generate a computer-implemented process, such that the instructions executed on the computer, other programmable data processing apparatuses, or other devices can implement the functions/actions specified in one or more blocks of the flow charts and/or block diagrams.

The flow charts and block diagrams in the drawings show system architectures, functions, and operations of possible implementations of systems, methods, and computer program products according to a plurality of implementations of the present disclosure. In this regard, each block of the flow charts or block diagrams may represent a module, a program segment, or a part of instructions, and the module, the program segment or the part of instructions includes one or more executable instructions for implementing specified logic functions. In some implementations as alternatives, the functions illustrated in the blocks may also occur in an order different from that illustrated in the drawings. For example, two continuous blocks may be executed basically in parallel in practice and may also be executed in a reverse order sometimes, which depends on the functions involved. It should also be noted that each block of the block diagrams and/or flow charts, and combinations of the blocks of the block diagrams and/or flow charts may be implemented by a dedicated hardware-based system that executes the specified functions or actions, or may be implemented by a combination of dedicated hardware and computer instructions.

Various implementations of the present disclosure have been described above. The description above is exemplary and non-exhaustive and is not limited to the various implementations disclosed. Many modifications and changes are obvious to a person of ordinary skill in the art without departing from the scope and spirit of the various implementations illustrated. The selection of terms used herein is intended to best explain the principle, practical application, or improvement on techniques in the market of each implementation or enable a person of ordinary skill in the art to understand each implementation disclosed herein.

The invention claimed is:

1. A method for backing up data, comprising:
receiving a request for a backup policy for data from a user, the request indicating a desired backup period for backing up the data;
obtaining backup information associated with the data;
generating, based on the desired backup period and the backup information, the backup policy for the data and satisfying a service level agreement; and
in response to determining that the generation of the backup policy for the data and satisfying the service level agreement based on the desired backup period and the backup information has failed, providing an adjustment suggestion for the desired backup period to the user.

2. The method according to claim 1, wherein the backup information comprises at least one selected from a group consisting of: a backup type of the data, a size of the data, a type of the data, a rate of change of the data, a network bandwidth for backing up the data, a location of a storage device for backing up the data, and an available bandwidth of the storage device.

3. The method according to claim 1, wherein generating the backup policy comprises:
determining a candidate backup period based on the desired backup period and the backup information, wherein the candidate backup period does not exceed the desired backup period;
determining, based on the candidate backup period, a recommended backup period satisfying the service level agreement; and
generating the backup policy indicating the recommended backup period.

4. The method according to claim 3, further comprising:
obtaining an efficiency factor for the backup policy, the efficiency factor being set based on at least one selected from a group consisting of: a storage medium type of a source device of the data, a network bandwidth for backing up the data, a deduplication rate of the data, a location of a storage device for backing up the data, and an available bandwidth of the storage device; and
adjusting the candidate backup period based on the efficiency factor.

5. The method according to claim 3, wherein the backup policy further indicates at least one selected from a group consisting of: a start time, an end time, and a duration for backing up the data, and a location of a storage device for backing up.

6. The method according to claim 1, wherein the backup policy comprises at least one selected from a group consisting of: an optimal backup quality policy and a most backup space-saving policy.

7. The method according to claim 1, further comprising:
providing the backup policy to the user.

8. The method according to claim 1, further comprising:
receiving adjustment information for the service level agreement from the user; and
setting the service level agreement based on the adjustment information.

9. An electronic device, comprising:
at least one processing unit; and
at least one memory coupled to the at least one processing unit and storing instructions to be executed by the at least one processing unit, wherein when executed by the at least one processing unit, the instructions cause the electronic device to execute a method, the method comprising:
receiving a request for a backup policy for data from a user, the request indicating a desired backup period for backing up the data;
obtaining backup information associated with the data;
generating, based on the desired backup period and the backup information, the backup policy for the data and satisfying a service level agreement; and
in response to determining that the generation of the backup policy for the data and satisfying the service level agreement based on the desired backup period and the backup information has failed, providing an adjustment suggestion for the desired backup period to the user.

10. The electronic device according to claim 9, wherein the backup information comprises at least one of selected from a group consisting of: a backup type of the data, a size of the data, a type of the data, a rate of change of the data, a network bandwidth for backing up the data, a location of a storage device for backing up the data, and an available bandwidth of the storage device.

11. The electronic device according to claim 9, wherein generating the backup policy comprises:
determining a candidate backup period based on the desired backup period and the backup information, wherein the candidate backup period does not exceed the desired backup period;
determining, based on the candidate backup period, a recommended backup period satisfying the service level agreement; and
generating the backup policy indicating the recommended backup period.

12. The electronic device according to claim 11, wherein the method further comprises:
obtaining an efficiency factor for the backup policy, the efficiency factor being set based on at least one selected from a group consisting of: a storage medium type of a source device of the data, a network bandwidth for backing up the data, a deduplication rate of the data, a location of a storage device for backing up the data, and an available bandwidth of the storage device; and
adjusting the candidate backup period based on the efficiency factor.

13. The electronic device according to claim 11, wherein the backup policy also indicates at least one selected from a group consisting of: a start time, an end time, and a duration for backing up the data, and a location of a storage device for backing up.

14. The electronic device according to claim 9, wherein the backup policy comprises at least one selected from a group consisting of: an optimal backup quality policy and a most backup space-saving policy.

15. The electronic device according to claim 9, wherein the method further comprises:
providing the backup policy to the user.

16. The electronic device according to claim 9, wherein the method further comprises:
receiving adjustment information for the service level agreement from the user; and
setting the service level agreement based on the adjustment information.

17. A computer program product tangibly stored in a non-transitory computer storage medium and comprising machine executable instructions, wherein when executed by a device, the machine executable instructions cause the device to execute a method, the method comprising:
receiving a request for a backup policy for data from a user, the request indicating a desired backup period for backing up the data;
obtaining backup information associated with the data;
generating, based on the desired backup period and the backup information, the backup policy for the data and satisfying a service level agreement; and
in response to determining that the generation of the backup policy for the data and satisfying the service level agreement based on the desired backup period and the backup information has failed, providing an adjustment suggestion for the desired backup period to the user.

18. The computer program product of claim 17, wherein generating the backup policy comprises:
determining a candidate backup period based on the desired backup period and the backup information, wherein the candidate backup period does not exceed the desired backup period;

determining, based on the candidate backup period, a recommended backup period satisfying the service level agreement; and generating the backup policy indicating the recommended backup period.

* * * * *